(12) United States Patent
Gerstel et al.

(10) Patent No.: US 8,724,984 B1
(45) Date of Patent: May 13, 2014

(54) AUTOMATED NOTIFICATION OF UPCOMING NETWORK DISRUPTIVE MAINTENANCE EVENTS TO ALLOW TRAFFIC TO BE REROUTED

(75) Inventors: Ornan Alexander Gerstel, Herzelia (IL); David Delano Ward, Somerset, WI (US)

(73) Assignee: Cisco Technology, Inc., San Jose, CA (US)

( * ) Notice: Subject to any disclaimer, the term of this patent is extended or adjusted under 35 U.S.C. 154(b) by 610 days.

(21) Appl. No.: 12/355,891

(22) Filed: Jan. 19, 2009

(51) Int. Cl.
*H04J 4/00* (2006.01)
*H04B 10/00* (2013.01)

(52) U.S. Cl.
USPC .................. 398/2; 398/1; 398/5; 398/7

(58) Field of Classification Search
None
See application file for complete search history.

(56) References Cited

U.S. PATENT DOCUMENTS

| | | | |
|---|---|---|---|
| 5,914,798 A * | 6/1999 | Liu | 398/7 |
| 7,146,098 B1 * | 12/2006 | Warbrick | 398/2 |
| 7,355,983 B2 | 4/2008 | Scudder et al. | |
| 7,477,843 B1 * | 1/2009 | Peeters et al. | 398/57 |
| 2003/0025957 A1 * | 2/2003 | Jayakumar | 359/110 |
| 2005/0177634 A1 * | 8/2005 | Scudder et al. | 709/225 |
| 2006/0087963 A1 * | 4/2006 | Jain et al. | 370/217 |

OTHER PUBLICATIONS

Pennell, Tim, Cisco Systems, Inc., "IP-over-DWDM," 2nd NGN Workshop, Municon, Munich Airport, Germany, Apr. 4, 2008, 45 pages.
"Fundanmental of DWDM Technology," Introduction to DWDM Technology, Chapter 2, 22 pages.
"10 Gigabit Ethernet Dense Wavelength-Division Multiplexing Interconnections in Enterprise Campus Networks," Cisco Systems, Inc., 2006 14 pages.

* cited by examiner

*Primary Examiner* — Armando Rodriguez
*Assistant Examiner* — Sean Hagan
(74) *Attorney, Agent, or Firm* — The Law Office of Kirk D. Williams

(57) ABSTRACT

In one embodiment, notifications of upcoming maintenance activities are provided by network devices, such as to allow packet switching or other optical layer client devices to reroute traffic prior to the occurrence of the traffic affecting event. For example, one such network device includes optical interfaces for coupling with fibers for transporting information using dense wavelength-division multiplexing (DWDM); DWDM switching equipment for cross-connecting wavelengths of the fibers; and a controller configured to inform packet switching or other optical layer client devices whose traffic would be affected by an upcoming event that would disrupt communication on one or more wavelengths on one or more fibers so that the packet switching or other optical layer client devices can reroute traffic that would otherwise go over said one or more wavelengths onto a different path in a network prior to said disruption.

22 Claims, 7 Drawing Sheets

AUTOMATED NOTIFICATION OF UPCOMING NETWORK DISRUPTIVE MAINTENANCE EVENTS TO ALLOW TRAFFIC TO BE REROUTED

TECHNICAL FIELD

The present disclosure relates generally to communications and computer systems, especially routers, packet switching systems, and other network devices.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). Dense wavelength-division multiplexing (DWDM) is being used to carry more traffic over a single optical fiber. As the name suggests, this technology transmits multiple signals simultaneously at different wavelengths on a same fiber. In one application, DWDM technology is being used to expand the bandwidth capacity of existing backbone networks. As more traffic is carried over a single fiber, maintenance of such fibers and equipment can have far reaching effects.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DESCRIPTION OF EXAMPLE EMBODIMENTS

1. Overview

Figure 1A:
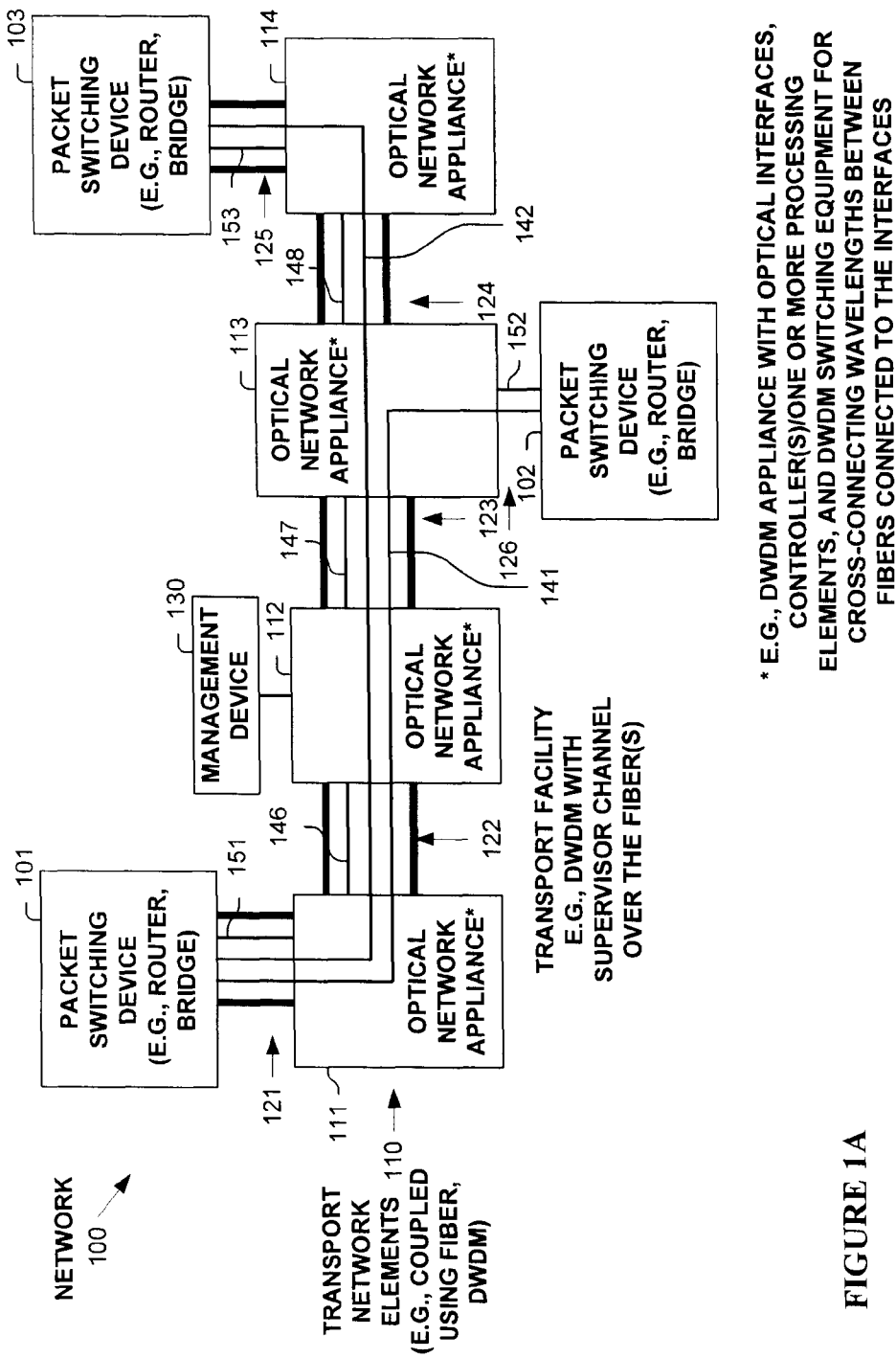
FIG. 1A illustrates a network operating according to one embodiment.

Disclosed are, inter alia, methods, apparatus, computer-storage media, mechanisms, and means associated with providing notifications of upcoming maintenance activities by network devices, such as to allow optical layer client devices (e.g., packet switching devices, optical network equipment, network appliance) to reroute traffic prior to the occurrence of the traffic affecting event. One embodiment determines the packet switching devices and/or optical network equipment that would be affected by a disruptive event (e.g., a disrupt in communication on one or more wavelengths on one or more optical fibers) to occur in the future, and provides notification to these devices and/or equipment. Such notification allows these devices and/or equipment to reroute traffic prior to the disruptive event. Such notification allows these devices and/or equipment to communicate acknowledgements to proceed with the disruptive event, or requests to delay or not to proceed with the disruptive event. In one embodiment, the packet switching and/or optical equipment reroutes the anticipated affected traffic to other routes or pathways (e.g., over different optical fibers and/or wavelengths). In one embodiment, the determination of the packet switching devices and/or optical network equipment that would be affected by a disruptive event is made by a centralized management device. In one embodiment, the determination of the packet switching devices and/or optical network equipment that would be affected by a disruptive event is made by one or more optical network appliances.

2. Description

Embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processors, ASICs, methods, and computer-readable media containing instructions. One or multiple systems, devices, components, etc. may comprise one or more embodiments, which may include some elements or limitations of a claim being performed by the same or different systems, devices, components, etc. The embodiments described hereinafter embody various aspects and configurations within the scope and spirit of the invention, with the figures illustrating exemplary and non-limiting configurations. Note, computer-readable media and means for performing methods and processing block operations are disclosed and are in keeping with the extensible scope and spirit of the invention. Moreover, nothing described or referenced in this document is admitted as prior art to this application unless explicitly so stated.

The steps, connections, and processing of signals and information illustrated in the figures, including, but not limited to any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation).

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps.

Disclosed are, inter alia, methods, apparatus, computer-storage media, mechanisms, and means associated with providing notifications of upcoming maintenance activities by network devices, such as to allow optical layer client devices (e.g., packet switching devices, optical network equipment, network appliance) to reroute traffic prior to the occurrence of the traffic affecting event. One embodiment determines the packet switching devices and/or optical network equipment that would be affected by a disruptive event (e.g., a disrupt in communication on one or more wavelengths on one or more optical fibers) to occur in the future, and provides notification to these devices and/or equipment. Such notification allows these devices and/or equipment to reroute traffic prior to the disruptive event. Such notification allows these devices and/or equipment to communicate acknowledgements to proceed with the disruptive event, or requests to delay or not to proceed with the disruptive event. In one embodiment, the packet switching and/or optical equipment reroutes the anticipated affected traffic to other routes or pathways (e.g., over different optical fibers and/or wavelengths). In one embodiment, the determination of the packet switching devices and/or optical network equipment that would be affected by a disruptive event is made by a centralized management device. In one embodiment, the determination of the packet switching devices and/or optical network equipment that would be affected by a disruptive event is made by one or more optical network appliances.

Note, an optical layer client device refers to an optical or packet switching networked device (e.g., appliance) that receives notification of the disruptive event; and possibly takes some action in response such as, but not limited to, acknowledging or requesting a deferral or cancellation of the disruptive event, rerouting traffic, and/or notifying additional devices. For example, in one embodiment, an optical layer client device is a packet switching device. In one embodiment, an optical layer client device is a time-division multiplexer (TDM). In one embodiment, an optical layer client device is an optical transport network (OTN) cross-connect device. In one embodiment, an optical layer client device is an add-drop multiplexer (ADM). In one embodiment, an optical layer client device is a router appliance.

One embodiment provides for packet switching and/or optical equipment to respond to the notification of the anticipated disruptive event. This response may be automatically generated by the equipment, such as in response to some configuration parameters, or based on the state of its interface or communications capabilities (e.g., there is another available path to route traffic that would otherwise be disrupted). In one embodiment, the optical equipment generates an alarm such as to notify an operator and/or operations/network management system. In one embodiment, the operator and/or operations/network management system determines for the equipment how to respond to the notification.

One embodiment includes: a plurality of optical interfaces for coupling with a plurality of fibers for transporting information; optical switching equipment for cross-connecting wavelengths of the plurality of fibers; and a controller configured to: determine one or more optical layer client devices whose traffic would be affected by a disruptive event to occur in the future that would disrupt communication on one or more wavelengths on one or more of said one or more fibers, and to inform said one or more optical layer client devices so that said one or more optical layer client devices can reroute traffic that would otherwise go over said one or more wavelengths onto a different path in a network prior to the disruptive event.

In one embodiment, the configuration to inform said one or more optical layer client devices includes the controller being configured to send, over each particular fiber of said one or more of the plurality of fibers, a message identifying which wavelengths of said particular fiber that will have communications disrupted by the disruptive event. In one embodiment, the apparatus is configured: to receive, from said one or more optical layer client devices, responses to said informing of said one or more optical layer client devices, and to react to said responses. In one embodiment, said reaction includes delaying, or stopping from occurring, the disruptive event.

One embodiment includes: a plurality of optical interfaces for coupling with a plurality of fibers for transporting information; optical switching equipment configured for cross-connecting wavelengths of the plurality of fibers; and one or more processing elements configured to determine based on said configuration of the cross-connecting wavelengths of the plurality of fibers, which one or more fibers of the plurality of fibers and which wavelengths on each of said one or more fibers will be affected by a disruptive event to occur in the future that would disrupt communication on one or more wavelengths of a specific fiber of the plurality of fibers, and to cause a message to be sent over each particular fiber of said one or more fibers and the specific fiber, with the message identifying the wavelengths on said particular fiber that would be affected by the disruptive event. In one embodiment, the apparatus is configured to send said messages on a corresponding supervisor channel on said particular fiber.

One embodiment includes: a plurality of optical interfaces for coupling with a plurality of fibers for transporting information; optical switching equipment for cross-connecting wavelengths of the plurality of fibers; and a controller configured to determine one or more directly connected optical layer client devices that will be affected by a disruptive event to occur in the future that would disrupt communication on one or more wavelengths on a fiber as indicated by a received message from another optical switching appliance, and to inform said optical layer client devices so that they can reroute traffic onto a different path in a network prior to said disruption.

In one embodiment, the apparatus is configured to receive said message on one of the plurality of interfaces. In one embodiment, the apparatus is configured to receive said message on a supervisor channel on one of the plurality of fibers. In one embodiment, the apparatus is configured to inform said optical layer client devices using Link Management Protocol (LMP) (i.e., with extensions as necessary to support these operations).

One embodiment includes a packet switching device, comprising: a plurality of network interfaces for sending and receiving packets; a controller; and a packet switching mechanism for communicating packets among the plurality of network interfaces and the controller; wherein the controller is configured to respond to a message received from another device informing the packet switching device of a disruptive event to occur in the future. In one embodiment, said response includes sending a message requesting that the disruptive event not occur or be postponed. In one embodiment, said response includes rerouting traffic through a different interface in anticipation of the disruptive event.

One embodiment includes a method performed by an apparatus including one or more processors and memory, with the method comprising: maintaining a network topology of an optical network coupling a plurality of optical layer client devices, with the optical network including a plurality of optical devices; in response to a disruptive event to occur in the future in the optical network causing a disruption of one or more wavelengths within the optical network, determining a particular plurality of the plurality of optical layer client devices will be affected; and notifying each particular optical layer client device in the particular plurality of optical layer client devices of said upcoming disruption that will affect said particular optical layer client device.

One embodiment includes the operations of: receiving a plurality of responses from the particular plurality of optical layer client devices, with at least one of said responses requesting the disruptive event not to occur; and providing notification of said at least one request that the disruptive event not occur. In one embodiment, said notification causes the cancelation or delay of the disruptive event.

One embodiment includes: identifying, by a first optical appliance, one or more wavelengths on a first fiber over which communications will be disrupted by an upcoming event; and signaling, by the first optical appliance in response to its said identification, over the first fiber identifying said one or more wavelengths on which communications will be disrupted by the upcoming event in order to inform one or more optical layer client devices whose traffic would be affected by said disruption in order to allow said one or more optical layer client devices to reroute traffic that would otherwise go over said one or more wavelengths onto a different path in a network prior to said disruption.

One embodiment includes performing the event, by the first optical appliance, to disrupt traffic over said one or more wavelengths on the first fiber. One embodiment includes: determining, by the first optical appliance in response to its said identification, one or more additional wavelengths of one or more additional fibers that the first optical appliance is configured to communicate traffic with at least one of said one or more wavelengths on the first fiber; and signaling, by the first optical appliance in response to said determination, over each of said one or more additional fibers in order to inform one or more additional optical layer client devices whose traffic would be affected by said disruption in order to allow said one or more additional optical layer client devices to reroute traffic that would otherwise be disrupted by said event. One embodiment includes: rerouting traffic that would otherwise go over said one or more wavelengths onto a different path in a network by said one or more optical layer client devices and said one or more additional optical layer client devices in response to said one or more optical layer client devices and said one or more additional optical layer client devices receiving notification based on said signaling by the optical equipment. In one embodiment, each of said one or more additional wavelengths of one or more additional fibers remain in service during said disruption. One embodiment includes: rerouting traffic that would otherwise go over said one or more wavelengths onto a different path in a network by said one or more optical layer client devices in response to said one or more optical layer client devices receiving notification based on said signaling by the first optical appliance.

One embodiment includes: determining, by a second optical appliance in response to receiving said signaling over a supervisor on the first fiber, one or more wavelengths on an additional fiber which the second optical device is configured to communicate traffic between said at least one of said one or more additional wavelengths and said one or more wavelengths on the additional fiber; and signaling, by a second optical appliance, over a supervisor channel on the additional fiber an identification of said one or more wavelengths on the additional fiber that will be affected by said disruption by the upcoming event in order to inform one or more additional optical layer client devices whose traffic would be affected by said disruption in order to allow said one or more additional optical layer client devices to reroute traffic that would otherwise be disrupted by said event.

In one embodiment, said identifying by the first optical appliance includes receiving information via a command line or network management interface of the upcoming event. In one embodiment, said upcoming event will remove said one or more wavelengths from service on the first fiber, but not all traffic carrying wavelengths on the first fiber. One embodiment includes: receiving a response from at least one of said one or more optical layer client devices in response to said signaling. In one embodiment, said at least one of said one or more responses corresponds to a request not to perform said disruption. One embodiment includes: delaying to upcoming event in response to said request not to perform said disruption.

Expressly turning to the figures, FIG. 1A illustrates an example network 100 including multiple optical layer client devices including: optical network appliances 110 (i.e., 111-114) and packet switching devices 101-103 coupled via transport facilities 121-126. In one embodiment, at least one (and possibly all) of packet switching devices 101-103 is a router. In one embodiment, at least one (and possibly all) of packet switching devices 101-103 is an Ethernet switch. As additionally shown in this example, optical network appliance 112 is coupled to a management device 130 (e.g., a craft terminal, network management system) for providing information to optical network appliance 112. Various means of communication among management device 130, packet switching devices 101-103, and optical network appliances 111-114 are used in one or more embodiments, with the means of communication including, but not limited to using in-band and/or out of band communication, such as, but not limited to, over an Ethernet or other network, over a supervisory wavelength and/or optical service channel, etc.

In one embodiment, at least one (and possibly all) of optical network appliances 111-114 is a DWDM appliance with optical interfaces, controller(s)/one or more processing elements, and DWDM switching equipment for cross-connecting or otherwise connecting wavelengths between fibers connected to the optical interfaces. In one embodiment, at least one (and possibly all) of transport facilities include an optical fiber using DWDM transmission, including a supervisor channel and multiple wavelengths. In one embodiment corresponding to FIG. 1A, each of transmission facilities 122-124 represents an optical fiber transporting multiple wavelengths and including a supervisor channel (146, 147, 148, respectively) between the optical network appliances 111-114. Path 141 is meant to illustrate a path of traffic between packet switching devices 101 and 102 through optical network appliances 111, 112, and 113 and over communications facilities 121, 122, 123, and 126. Path 142 is meant to illustrate a path of traffic between packet switching devices 101 and 103 through optical network appliances 111, 112, 113, and 114 and over communications facilities 121, 122, 123, 124 and 125.

Figure 1B:
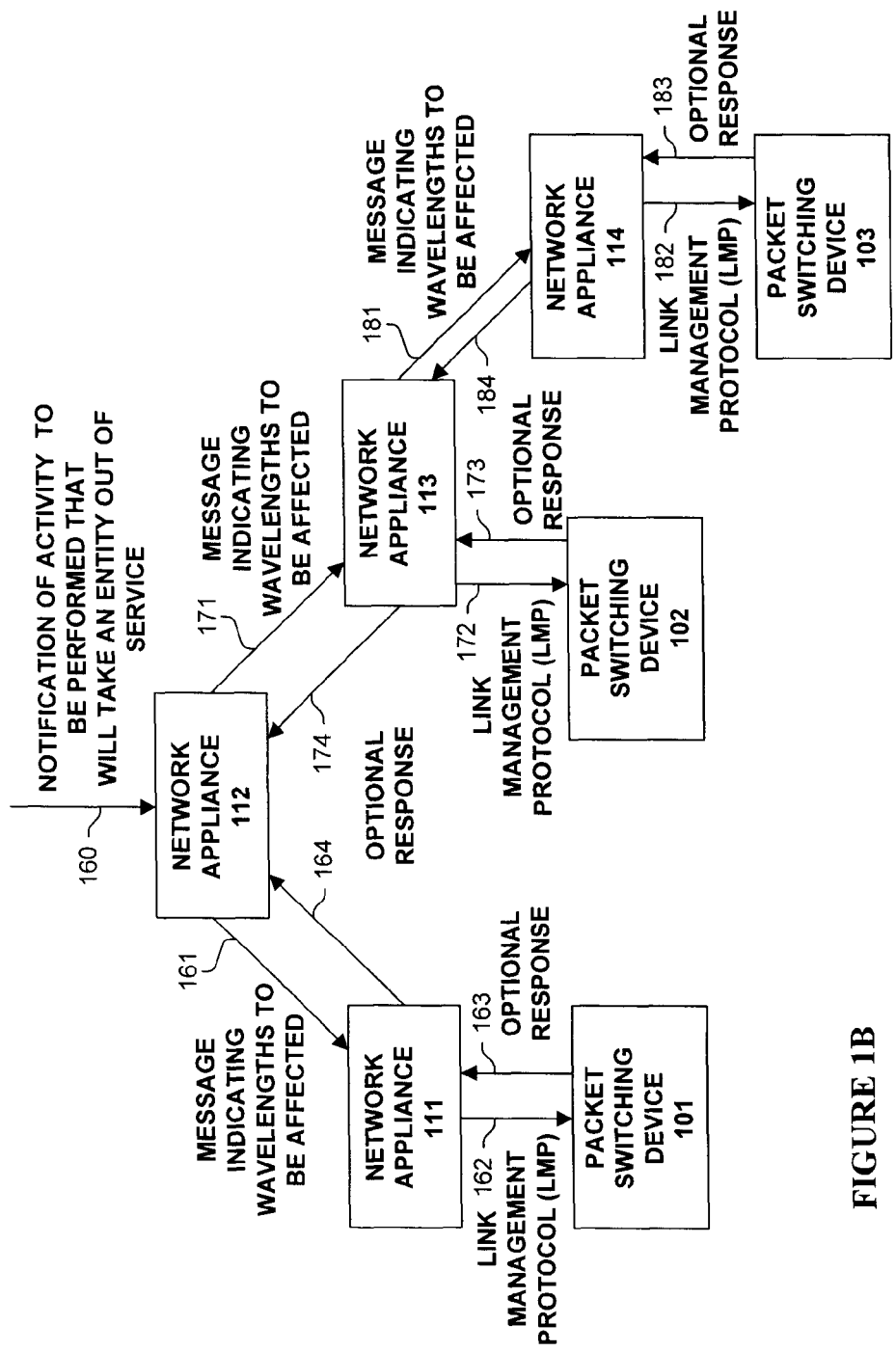
FIG. 1B illustrates a network operating according to one embodiment.

FIG. 1B illustrates an operation of one embodiment based on network 100 of FIG. 1A. In this scenario, network appliance 112 identifies that an upcoming event will disrupt traffic on one or more wavelengths of one or more fibers connected to it. This event may include, but is not limited to, shutting down network appliance 112, replacing an interface board or port which may take down one or more, all or even less than all fibers or wavelengths on a fiber, disconnecting a fiber, etc. In one embodiment, this identification is made in response to input received from management device 130 (FIG. 1A).

In response to the identification of the upcoming event, network appliance 112 (e.g., a controller or processing element therein) identifies which fibers and which wavelengths thereon will be affected by the upcoming event. These wavelengths and fibers to be affected could be directly impacted (e.g., certain transmitters are going to be replaced) or affected based on the configuration of the switching performed by the network appliance. For example, if the event is going to remove a wavelength on a first fiber, if this wavelength is cross-connected to a wavelength on a second fiber, then the event will also disrupt traffic on this wavelength of the second fiber. Therefore, in order to notify all packet switching devices that will be affected by the event, the corresponding network elements which cause traffic to be transmitted over each wavelength on each fiber to be affected are taken into consideration in one embodiment.

To better illustrate, let's assume that the upcoming event identifies that the optical interface of network appliance 112 connected to fiber 122 is going to be taken down for service. This will affect the traffic carried on paths 141 and 142 in the network, and optical device will take steps to notify packet switching devices 101, 102, and 103 of such disruptive event, so they can reroute traffic to avoid the disruption. In one embodiment, packet switching devices 101, 102, and 103 may respond with a message identifying an acceptance to proceed or a request not to proceed as, for example, the traffic cannot be currently rerouted or that it is an otherwise detrimental time for the event to occur. In one embodiment, any of the optical layer client devices 101-103 and 111-114 may respond with a message identifying an acceptance to proceed or a request not to proceed as, for example, the traffic cannot be currently rerouted or that it is an otherwise detrimental time for the event to occur. In one embodiment, network appliance 112 will consider and possibly abide by any such received responses.

Proceeding with our example, as shown in FIG. 1B, network appliance 112 receives notification of an upcoming event that will take an entity out of service. Network appliance 112 determines the fibers and wavelengths thereon which will be affected and sends a message (161, 171) over each fiber identifying the affected wavelengths (which may be the entire fiber).

Proceeding down the left side of the message tree, network appliance 111 receives the message (161) and determines that these waves to be affected are connected to packet switching device 101. Network appliance 111 notifies (162) packet switching device 101 of the paths to be affected, such as by using Link Management Protocol. In one embodiment, packet switching device 101 terminates a DWDM fiber, and therefore, would typically receive the message over the fiber as discussed in relation to communicating to an optical network device. In response, packet switching device 102 takes action, such as rerouting traffic using one or more of a vast array of rerouting mechanisms, such as, but not limited to fast reroute, protected facilities, etc. In one embodiment, an optional response (e.g., proceed/ACK, don't proceed/NAK) message is generated by one or more optical layer client devices and communicated (163, 164) back to network appliance 112.

Similarly, proceeding down the right side of the message tree, network appliance 113 receives the message (161) and determines that one of these waves to be affected is connected to packet switching device 102, and another is connected to network appliance 114. Network appliance 112 notifies (172) packet switching device 102 of the paths to be affected, such as by using Link Management Protocol. In response, packet switching device 102 takes action, such as rerouting traffic using one or more of a vast array of available rerouting mechanisms. In one embodiment, an optional response (e.g., proceed/ACK, don't proceed/NAK) message is generated by one or more optical layer client devices and communicated (173, 174) back to network appliance 112. Additionally, network appliance 113 notifies (181) network appliance 114 of the wavelengths that will be affected, and network appliance 114 determines that the affected wavelengths will affect traffic to packet switching device 103, which it notifies (182). In one embodiment, an optional response (e.g., proceed/ACK, don't proceed/NAK) message is generated by one or more optical layer client devices and communicated (183, 184, 174) back to network appliance 112.

As shown, each network appliance determines, based on the incoming wavelengths that will be affected, any network devices and/or packet switching devices which need to be notified, as their traffic will be affected. These operations performed in one embodiment will be further described hereinafter in relation to the flow diagrams of FIGS. 2A, 2B and 2C.

Figure 1C:
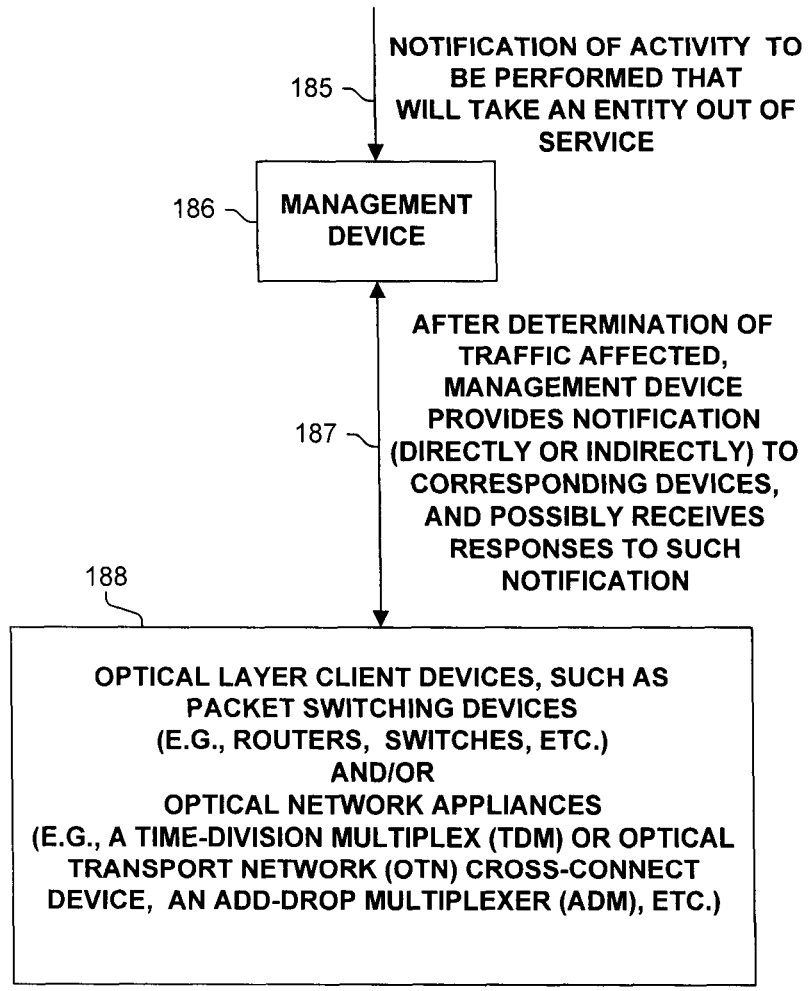
FIG. 1C illustrates a network operating according to one embodiment.

FIG. 1C illustrates an operation of one embodiment. As shown, management device 186 receives (187) a notification of an activity to be performed in the future that will take an entity out of service (i.e., result in a communication disruption). In response, management device 186 determines the affected one or more optical layer client devices 188 (e.g., packet switching and/or optical appliances), and provides notification (directly or indirectly) to these said determined affected optical layer client devices 188. In one embodiment, one or more of these optical layer client devices 188 switches traffic to avoid the anticipated traffic disruption. In one embodiment, management device 186 receives (187) a response to said notification from one or more of these affected optical layer client devices 188. In one embodiment, said response includes an acknowledgment of the anticipated disruption. In one embodiment, said response includes a request to delay or stop from occurring said anticipated disruption; with management device 186 possibly taking a responsive action to delay or stop from occurring the anticipated disruptive event.

Figure 1D:
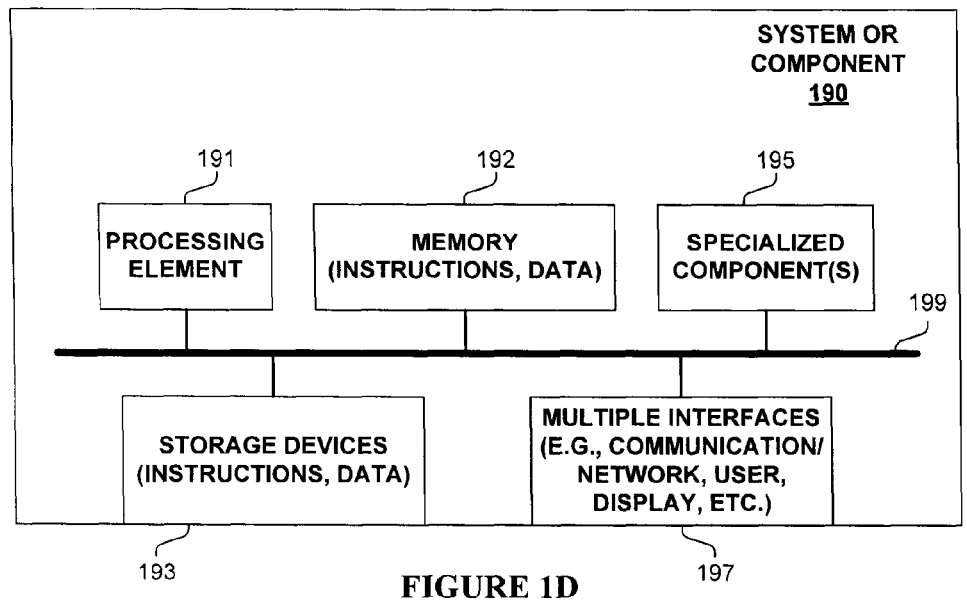
FIG. 1D illustrates an example system or component used in one embodiment.

FIG. 1D illustrates a block diagram of a system or component 190 used in one embodiment associated with providing notifications of upcoming maintenance activities by network devices, such as to allow packet switching or other optical layer client devices to reroute traffic prior to the occurrence of the traffic affecting event. In one embodiment, system or component 190 performs one or more processes corresponding to one of the flow diagrams illustrated or otherwise described herein. In one embodiment, a system or component 190 is used in a controller of an optical layer client device, packet switching device and/or as part of a network management system or interface to an optical layer client device.

In one embodiment, system or component 190 includes a processing element 191, memory 192, storage devices 193, specialized components 195 (e.g. optimized hardware such as for performing operations, etc.), and interface(s) 197 for communicating information (e.g., sending and receiving packets, user-interfaces, displaying information, etc.), which are typically communicatively coupled via one or more communications mechanisms 199, with the communications paths typically tailored to meet the needs of the application.

Various embodiments of component 190 may include more or less elements. The operation of component 190 is typically controlled by processing element 191 using memory 192 and storage devices 193 to perform one or more tasks or processes. Memory 192 is one type of computer-readable/computer-storage medium, and typically comprises random access memory (RAM), read only memory (ROM), flash memory, integrated circuits, and/or other memory components. Memory 192 typically stores computer-executable instructions to be executed by processing element 191 and/or data which is manipulated by processing element 191 for implementing functionality in accordance with an embodiment. Storage devices 193 are another type of computer-readable medium, and typically comprise solid state storage media, disk drives, diskettes, networked services, tape drives, and other storage devices. Storage devices 193 typically store computer-executable instructions to be executed by processing element 191 and/or data which is manipulated by processing element 191 for implementing functionality in accordance with an embodiment.

Figure 2A:
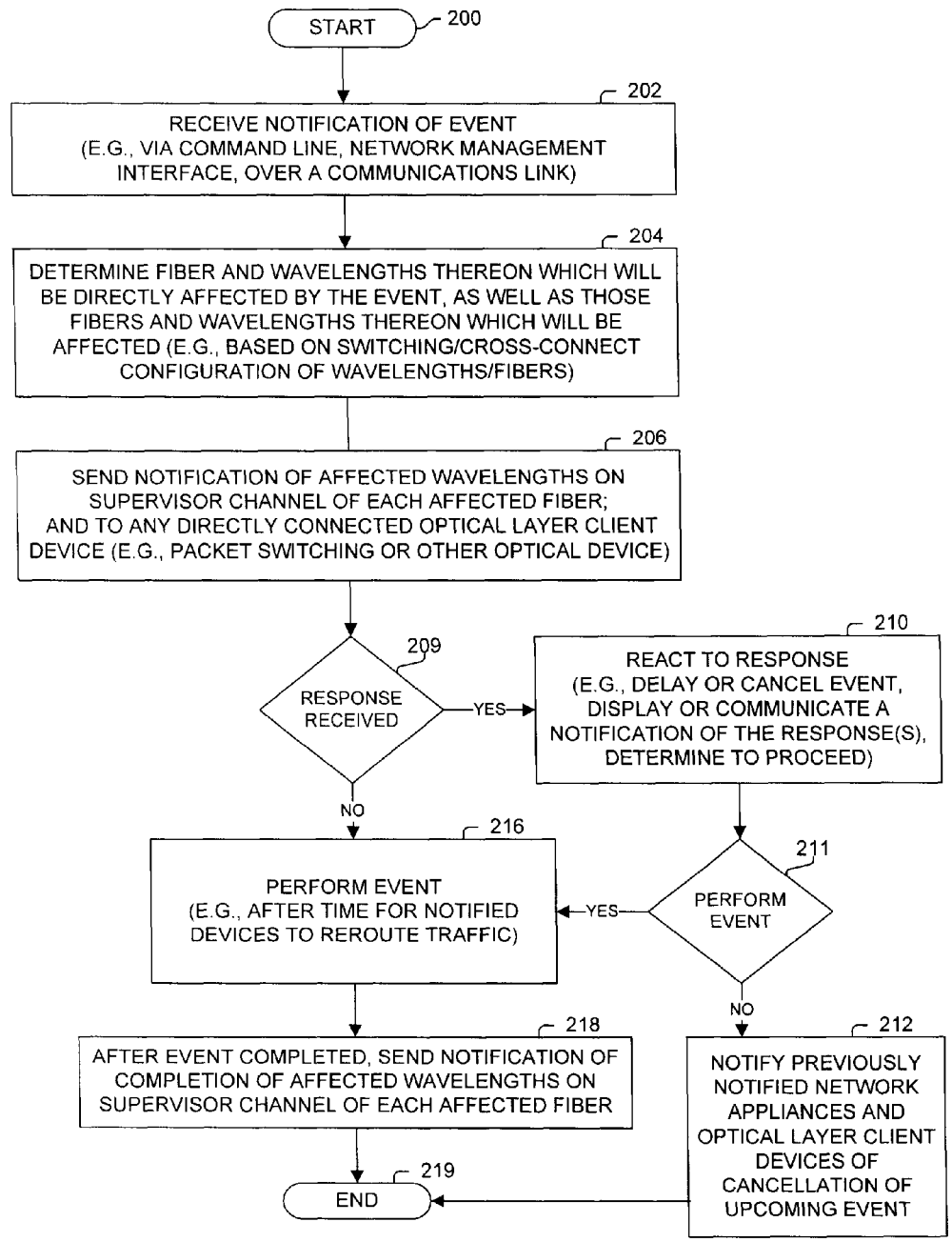
FIG. 2A illustrates a process performed in one embodiment.

FIG. 2A illustrates a process performed in one embodiment, such as by an optical layer client device identifying a local event that will disrupt traffic. Processing begins with process block 200. In process block 202, the optical layer client device receives notification of (e.g., identifies) an upcoming event, such as, but not limited to via a command line or network management interface, or communicated to it in another fashion (e.g., via an internal process, especially if scheduled to occur at a certain time). In process block 204, the optical layer client device determines which fibers and wavelengths thereon will be directly affected by the event, as well as those fibers and wavelengths thereon which will be affected based on the switching/cross-connect configuration of the optical layer client device. In process block 206, a notification of the affected wavelengths of each affected fiber is communicated to the optical layer client device, typically over a supervisor channel of the fiber which will have one or more wavelengths of traffic affected. Additionally, any directly connected packet switching or other optical layer client devices (e.g., those without another DWDM network appliance connected in between) are notified of the paths that will be affected (e.g., using Link Management Protocol, another network management protocol, or other means).

As determined in process block 209, if any responses are received from a packet switching device or other optical layer client device, then in process block 210, the optical layer client device reacts to the response(s), such as by, but not limited to delaying or cancelling the event, displaying or communicating a message to a network management device, determining to proceed with the event. As determined in process block 211, if the event is to occur, then processing proceeds to process block 211; otherwise, in process block 212, the previously notified optical layer client devices are notified of the cancellation of the upcoming event; and processing of the flow diagram of FIG. 2A is complete as illustrated by process block 219.

Otherwise, in process block 216, the event is performed (e.g., possibly after time to allow for affected packet switching or other optical layer client devices to reroute traffic). As described in relation to process block 218, after the event is completed (e.g., the card, board, port is replaced, the optical layer client device is restarted, etc.), the previously notified optical layer client devices are notified of the completion, such as by sending this notification on a supervisor of each affected fiber. Processing of the flow diagram of FIG. 2A is complete as illustrated by process block 219.

Figure 2B:
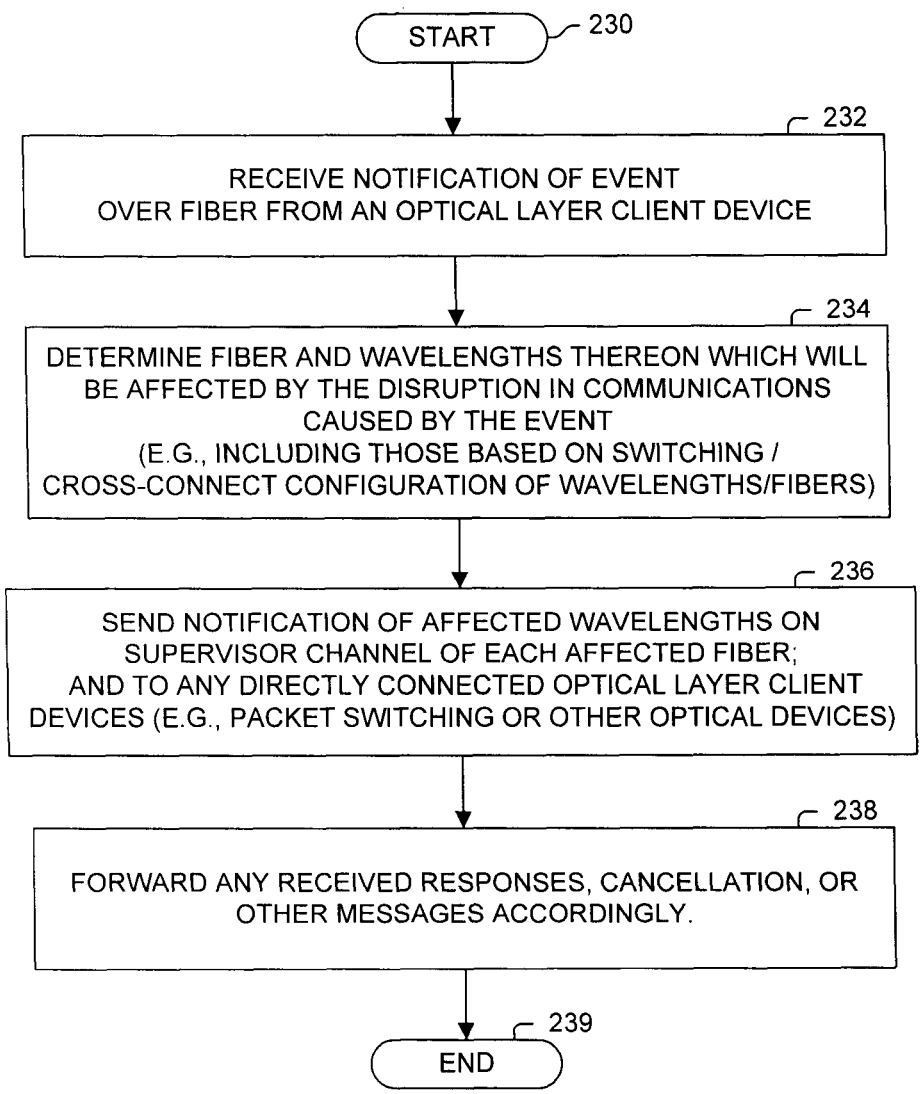
FIG. 2B illustrates a process performed in one embodiment.

FIG. 2B illustrates a process used in one embodiment, such as performed by an optical layer client device. Processing begins with process block 230, and proceeds to process block 232, wherein a notification is received from another optical layer client device, such as over the supervisor channel of a connecting fiber. In process block 234, the fiber and wavelengths thereon which will be affected by the disruption in communications caused by the event are determined based on the receive identification of the incoming affected wavelengths and the switching/cross-connect configuration of the optical layer client device connecting these affected wavelengths to one or more wavelengths on one or more fibers. In process block 236, a notification of the downstream affected wavelengths are sent on the supervisor channel of corresponding fiber(s), and/or any directly connected packet switching or other optical layer client device is notified of its paths to be affected by the upcoming event. In process block 238, any received response, cancellation, or other messages are forwarded accordingly. Processing of the flow diagram of FIG. 2B is complete as illustrated by process block 239.

Figure 2C:
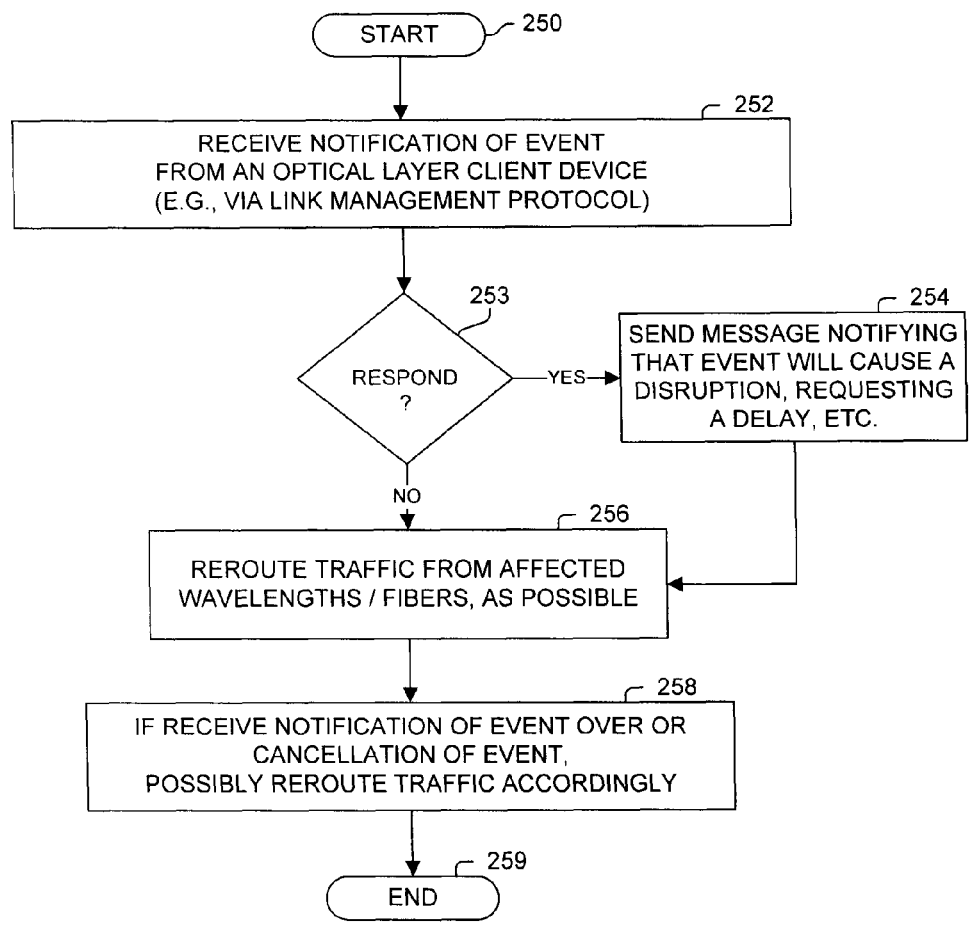
FIG. 2C illustrates a process performed in one embodiment.

FIG. 2C illustrates a process used in one embodiment, such as performed by a packet switching or other optical layer client device. Processing begins with process block 250, and proceeds to process block 252, wherein the packet switching or other optical layer client device receives a notification of its paths (e.g., the wavelengths/fibers) that are going to be affected by the upcoming event. As determined in process block 253, if the packet switching or other optical layer client device is configured to respond (e.g., its configuration reflects that it should respond, or in response to analyzing the affected traffic and determining that it cannot reroute all of the affected traffic), then in process block 254, the packet switching or other optical layer client device sends a message in order to notify the originating optical layer client that the packet switching or other optical layer client device will not be able to reroute all traffic, and possibly requesting a delay or cancellation of the upcoming event. In process block 256, the traffic that would be affected is rerouted as possible. In process block 258, if a notification of the cancellation or completion of the event is received, then the traffic is possibly routed accordingly. Processing of the flow diagram of FIG. 2C is complete as illustrated by process block 259.

In view of the many possible embodiments to which the principles of our invention may be applied, it will be appreciated that the embodiments and aspects thereof described herein with respect to the drawings/figures are only illustrative and should not be taken as limiting the scope of the invention. For example, and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:
1. An apparatus, comprising:
an optical cross-connect appliance of an optical layer, wherein the optical cross-connect appliance includes:
a plurality of optical interfaces for coupling with a plurality of fibers for transporting information;

optical switching equipment for cross-connecting wavelengths of the plurality of fibers, wherein the plurality of fibers includes a first fiber and a second fiber; and a controller configured to: in response to determining an affected wavelength of a plurality of wavelengths communicated on the second fiber whose traffic would be affected by an event to occur in the future that would affect communication on a first wavelength of a plurality of wavelengths communicated on the first fiber based on the current configuration of said optical switching equipment cross-connecting the first wavelength to the affected wavelength on the second fiber, signaling over the second fiber because the affected wavelength is carried on the second fiber and prior to the commencement of the event, identifying that traffic on the affected wavelength was going to be affected;

wherein the optical layer refers to an optical network, including the optical cross-connect appliance, providing light paths to optical network client devices.

2. The apparatus of claim 1, wherein said configuration to signal over the second fiber, prior to the commencement of the event, identifying that traffic on the affected wavelength was going to be affected includes the controller being configured to signal over a supervisory channel of the second fiber that traffic on the affected wavelength was going to be affected.

3. The apparatus of claim 1, wherein the apparatus includes one or more optical layer appliances communicatively coupled between the optical cross-connect appliance and a particular optical layer client device, wherein the optical cross-connect appliance is communicatively coupled to the particular optical layer client device via the affected wavelength through said one or more optical layer appliances;

wherein said one or more optical layer appliances are configured to propagate through the optical layer to the particular optical layer client on fibers that will have at least one wavelength affected by the event a notification identifying that traffic on a said corresponding wavelength was going to be affected by the event to occur in the future; and wherein the optical cross-connect appliance is configured: to receive, from the particular optical layer client device, a response to said notification, and to react to the response.

4. The apparatus of claim 3, wherein said reaction includes delaying, or stopping from occurring, the event.

5. The apparatus of claim 1, wherein the particular optical layer client device is a packet switching device.

6. The apparatus of claim 1, wherein said one or more optical layer appliances include: a time-division multiplex (TDM), optical transport network (OTN) cross-connect device, or an add-drop multiplexer (ADM).

7. A method, comprising:
identifying, by a first optical appliance, one or more wavelengths, but less than all wavelengths, on a first fiber over which communications will be disrupted by an upcoming event that will disrupt traffic on one or more wavelengths of a different fiber based on a current cross-connecting by the first optical appliance of said one or more wavelengths on the first fiber with wavelengths on the different fiber; and signaling, by the first optical appliance in response to its said identification, over each of the first fiber and the different fiber identifying said one or more wavelengths on which communications will be disrupted by the upcoming event in order to inform one or more packet switching devices whose traffic would be affected by said disruption in order to allow said one or more packet switching devices to reroute traffic that would otherwise go over said one or more wavelengths onto a different path in a network prior to said disruption.

8. The method of claim 7, comprising performing the event, by the first optical appliance, to disrupt traffic over said one or more wavelengths on the first fiber.

9. The method of claim 7, comprising: determining, by the first optical appliance in response to its said identification, one or more additional wavelengths, but less than all wavelengths, of one or more additional fibers that the first optical appliance is configured to communicate traffic with at least one of said one or more wavelengths on the first fiber; and signaling, by the first optical appliance in response to said determination, over each of said one or more additional fibers in order to inform one or more additional packet switching devices whose traffic would be affected by said disruption in order to allow said one or more additional packet switching devices to reroute traffic that would otherwise be disrupted by said event.

10. The method of claim 9, including rerouting traffic that would otherwise go over said one or more wavelengths onto a different path in a network by said one or more packet switching devices and said one or more additional packet switching devices in response to said one or more packet switching devices and said one or more additional packet switching devices receiving notification based on said signaling by the optical equipment.

11. The method of claim 9, wherein each of said one or more additional wavelengths of one or more additional fibers remain in service during said disruption.

12. The method of claim 7, including rerouting traffic that would otherwise go over said one or more wavelengths onto a different path in a network by said one or more packet switching devices in response to said one or more packet switching devices receiving notification based on said signaling by the first optical appliance.

13. The method of claim 7, comprising:
determining, by a second optical appliance in response to receiving said signaling over a supervisor on the first fiber, one or more wavelengths on an additional fiber which the second optical device is configured to communicate traffic between said at least one of said one or more additional wavelengths and said one or more wavelengths on the additional fiber;

signaling, by a second optical appliance, over a supervisor channel on the additional fiber an identification of said one or more wavelengths on the additional fiber that will be affected by said disruption by the upcoming event in order to inform one or more additional packet switching devices whose traffic would be affected by said disruption in order to allow said one or more additional packet switching devices to reroute traffic that would otherwise be disrupted by said event.

14. The method of claim 7, wherein said upcoming event will remove said one or more wavelengths from service on the first fiber, but not all traffic carrying wavelengths on the first fiber.

15. The method of claim 7, wherein said one or more optical layer client devices includes a packet switching device.

16. The method of claim 7, wherein said one or more optical layer client devices includes a time-division multiplex (TDM) or optical transport network (OTN) cross-connect device, or said one or more optical layer client devices includes an add-drop multiplexer (ADM).

17. The method of claim 1, comprising: receiving, by the first optical appliance from a source external to the first optical appliance, a notification of the upcoming event; and wherein said identifying operation of the said one or more wavelengths, but less than all wavelengths, on the first fiber is performed in response to said receipt of the notification of the upcoming event.

18. The method of claim 17, wherein said receiving the notification is performed via a command line interface.

19. The method of claim 17, wherein said receiving the notification is performed via a network management interface.

20. The apparatus of claim 1, wherein the optical cross-connect appliance is configured to receive a notification of the event to occur in the future from a source external to the apparatus; and where said configuration to determine the affected wavelength is responsive to receiving the notification.

21. The apparatus of claim 20, wherein said configuration to receive the notification is via a command line interface.

22. The apparatus of claim 20, wherein said configuration to receive the notification is via a network management interface.

* * * * *